US008009251B2

(12) United States Patent
Wu et al.

(10) Patent No.: US 8,009,251 B2
(45) Date of Patent: Aug. 30, 2011

(54) HIGH BRIGHTNESS LIQUID CRYSTAL DISPLAY

(75) Inventors: Pei-Hsun Wu, Tao Yuan Shien (TW);
Ying-Che Lan, Tao Yuan Shien (TW);
Chih-Haw Wang, Tao Yuan Shien (TW);
Szu-Han Li, Tao Yuan Shien (TW);
Keng-Ju Liu, Tao Yuan Shien (TW)

(73) Assignee: Au Optronics Corporation, Hsin-chu (TW)

( * ) Notice: Subject to any disclaimer, the term of this patent is extended or adjusted under 35 U.S.C. 154(b) by 1129 days.

(21) Appl. No.: 11/785,976

(22) Filed: Apr. 23, 2007

(65) Prior Publication Data

US 2007/0285597 A1    Dec. 13, 2007

(30) Foreign Application Priority Data

Jun. 13, 2006  (TW) ............... 95121087 A
Jun. 13, 2006  (TW) ............... 95121088 A
Jan. 10, 2007  (TW) ............... 96100972 A

(51) Int. Cl.
*G02F 1/1335*     (2006.01)
(52) U.S. Cl. .......... 349/95; 349/65; 349/96; 349/97
(58) Field of Classification Search .......... 349/65, 349/95–97
See application file for complete search history.

(56) References Cited

U.S. PATENT DOCUMENTS

| | | | |
|---|---|---|---|
| 5,771,085 A | 6/1998 | Ochi et al. | |
| 5,844,644 A | 12/1998 | Oh et al. | |
| 6,421,105 B1 | 7/2002 | Shieh et al. | |
| 7,034,908 B2 | 4/2006 | Liu | |
| 7,542,107 B2 | 6/2009 | Hayakawa | |
| 2003/0043315 A1* | 3/2003 | Umemoto et al. | 349/65 |
| 2003/0156325 A1* | 8/2003 | Hoshi | 359/486 |
| 2006/0012739 A1 | 1/2006 | Shibazaki | |
| 2006/0244878 A1 | 11/2006 | Kim et al. | |
| 2007/0013830 A1 | 1/2007 | Hayakawa | |
| 2007/0085215 A1* | 4/2007 | Budd et al. | 257/778 |

FOREIGN PATENT DOCUMENTS

| | | |
|---|---|---|
| CN | 1896771 A | 1/2007 |
| JP | 5-341283 | 12/1993 |
| JP | 9-43587 A | 2/1997 |
| JP | 9-43588 | 2/1997 |
| JP | 2000-39608 A | 2/2000 |
| JP | 2000-235178 | 8/2000 |
| JP | 2001-66595 | 3/2001 |
| JP | 2003-84276 | 3/2003 |
| JP | 2004-199006 A | 7/2004 |
| JP | 2004-246100 A | 9/2004 |
| JP | 2004-354606 | 12/2004 |
| TW | 557367 | 10/2003 |
| TW | 588195 | 5/2004 |
| TW | 200638091 | 11/2006 |

* cited by examiner

*Primary Examiner* — Julie-Huyen L Ngo
(74) *Attorney, Agent, or Firm* — Rabin & Berdo, PC

(57) ABSTRACT

The LCD sequentially includes, from bottom to top, a backlight module, a first polarizer, a first substrate, a liquid crystal layer, a second substrate, and a second polarizer. The second substrate includes multiple transparent areas thereon. The first substrate includes multiple light-focusing arrays. Each of the light-focusing arrays includes multiple high-refractive areas and low-refractive areas disposed between the high-refractive areas. The multiple high-refractive areas includes a first high-refractive area and multiple second high-refractive area disposed on two sides of the high-refractive areas symmetrically, wherein the widths of the second high-refractive areas are the same and smaller than the width of the first high-refractive area.

6 Claims, 17 Drawing Sheets

HIGH BRIGHTNESS LIQUID CRYSTAL DISPLAY

RELATED APPLICATIONS

This application claims priorities to Taiwan Application Serial Number 95121087, filed Jun. 13, 2006, Taiwan Application Serial Number 96100972, filed Jan. 10, 2007, and Taiwan Application Serial Number 95121088, filed Jun. 13, 2006, which are herein incorporated by reference.

BACKGROUND

1. Field of Invention

This invention relates to a liquid crystal display. More particularly, this invention relates to a high brightness liquid crystal display.

2. Description of Related Art

Optoelectronics technologies have recently progressed by leaps and bounds due to the coming of the digital era, which also has stimulated the market for liquid crystal displays (LCDs). LCD has many advantages, such as high display quality, small volume, light weight, low driving voltage and low power consumption. Hence, LCDs are widely used in small portable televisions, mobile telephones, notebook computers, desktop monitors, projector televisions and the like, and have gradually replaced the conventional cathode ray tube (CRT) displays as a mainstream display unit.

Because liquid crystal isn't luminescent itself, a backlight module is used as a light source so that an image on LCD can be displayed. The backlight type LCD comprises a front-end liquid crystal panel and a back-end backlight module.

Brightness of is one of important properties of LCD. Conventionally, the method for improving the brightness of the LCD is to increase aperture ratio or to use optical films, such as brightness enhance film, in the backlight module. However, if the aperture ratio is increased to improve the brightness of the LCD, difficulties of manufacturing process and costs are raised. If several optical films were used in the backlight module to improve the brightness, another problem would be generated. For example, light is absorbed by the optical films during light transmission, which results in decreased utilization of light and increased costs. Furthermore, damage of the optical films can be caused by performing reliability tests of these optical films, which results in increased costs. In addition, if these optical films are disposed improperly, a moire effect, which is an interference pattern, are easily generated, so defects in visual effect are likely to happen.

Thus, in the U.S. Pat. No. 6,421,105, it provides a method to solve these problems, which micro lens arrays having curved surfaces are formed on an upper glass substrate surface of a LCD cell. The curved surfaces of the micro lens arrays are used to improve the brightness of the LCD. However, it is not easy to manufacture micro-scale devices having curved surfaces. Moreover, due to the restriction of sizes and structures of the micro lens, increasing the curve degree of the curved surfaces of the micro lens cannot enhance the brightness of the LCD further.

SUMMARY

A LCD with high-brightness is provided. The LCD sequentially comprises, from bottom to top, a backlight module, a first polarizer, a first substrate, a liquid crystal layer, a second substrate, and a second polarizer. The second substrate comprises plural transparent areas thereon.

According to an embodiment of this invention, high-refractive areas, right below the transparent areas, are disposed either on a surface, facing the backlight module, of the first substrate or on a polymer layer between the backlight module and the first polarizer or between the first polarizer and the first substrate. Low-refractive areas are disposed between the high-refractive areas. The refractive index of the high-refractive areas is greater than that of the low-refractive areas.

According to another embodiment of this invention, light-focusing arrays, instead of high-refractive areas described above, can be disposed either on a surface, facing the backlight module, of the first substrate or on a polymer layer between the backlight module and the first polarizer or between the first polarizer and the first substrate. Each of the light-focusing arrays comprises plural high-refractive areas and low-refractive areas between the high-refractive areas. The plural high-refractive areas comprises a first high-refractive area and plural second high-refractive area disposed on two sides of the high-refractive areas symmetrically, wherein the widths of the second high-refractive areas are the same and smaller than the width of the first high-refractive area.

According to another embodiment of this invention, in addition of the light-focusing arrays on the first substrate, the second substrate can further comprise light-defocusing arrays including plural low-refractive areas having refractive index smaller than that of the second substrate. Each of the low-refractive areas is located right above each of the high-refractive areas and has the same shape as that of each of the high-refractive areas.

BRIEF DESCRIPTION OF THE DRAWINGS

An embodiment of this invention can be more fully understood by reading the following detailed description of the embodiment, with reference made to the accompanying drawings as follows.

DETAILED DESCRIPTION

According to a series of embodiments in this invention, high-refractive areas, right below transparent areas on a second substrate respectively, are produced on a first substrate or a first polarizer to condense light capable of passing the transparent areas, so that the brightness and the contrast of LCD can be increased.

According to another series of embodiments in this invention, light-focusing arrays including plural high-refractive areas, instead of only one high-refractive area, are produced on a first substrate or a first polarizer below the second substrate. Each light-focusing array is right below each transparent area on a second substrate to condense light capable of passing the transparent areas, and the brightness and the contrast of LCD can thus be increased.

Embodiment 1

Figure 1A:
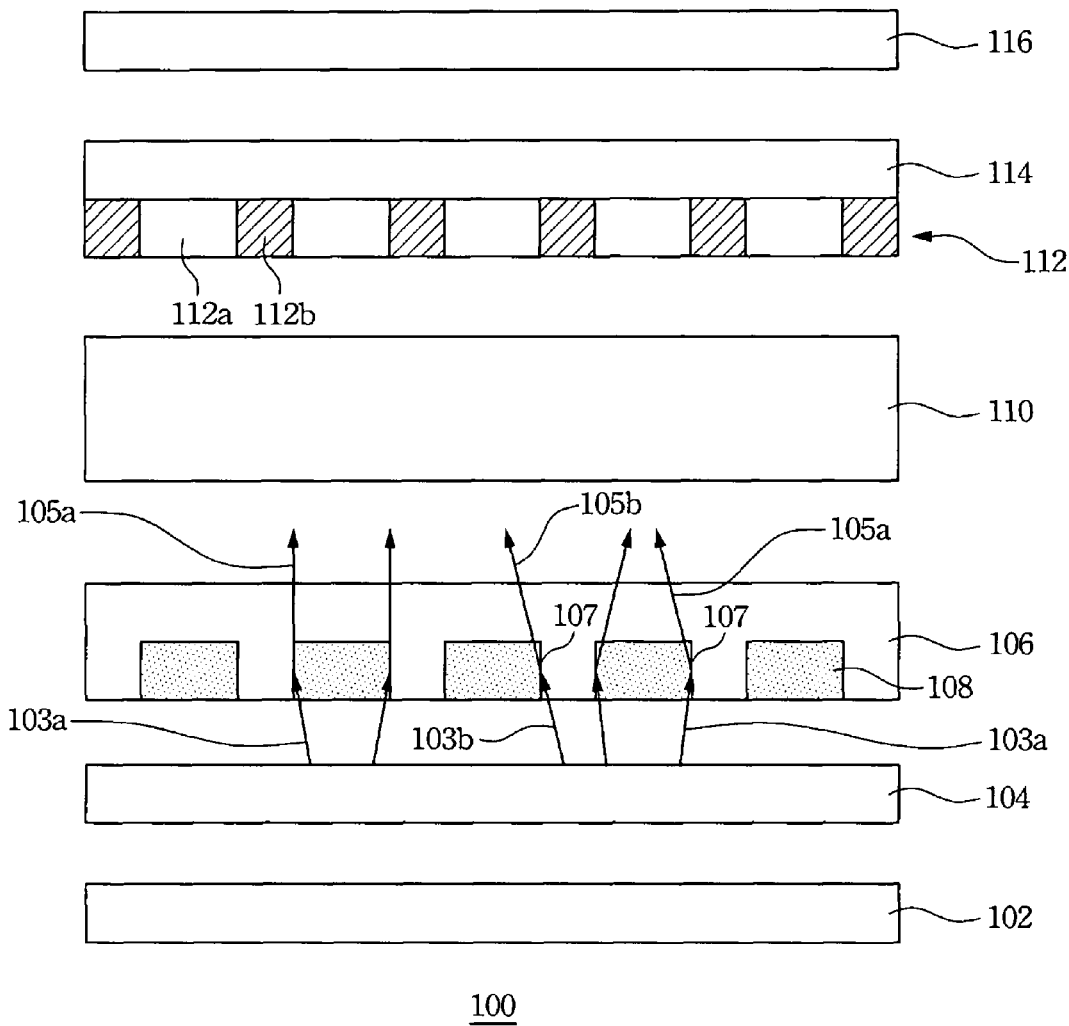
FIGS. 1A and 1B are cross-sectional diagrams showing LCDs according to an embodiment of this invention.

FIG. 1A is a cross-sectional diagram showing a LCD according to an embodiment of this invention. In FIG. 1A, a LCD 100 sequentially, from bottom to top, comprises a backlight module 102, a first polarizer 104, a first substrate 106, a liquid crystal layer 110, a color filter layer 112, a second substrate 114 and a second polarizer 116. The first substrate 106 comprises plural high-refractive areas 108 on one surface, facing the first polarizer 104, of the first substrate 106. The color filter layer 112 comprises transparent areas 112a and opaque areas 112b. Each of the transparent area 112a is permeable to red light, green light or blue light.

The high-refractive areas 108, of the first substrate 106 are disposed right below the transparent areas 112a of the color filter layer 112 on the second substrate 114. The surface areas occupied by the transparent areas 112a on the second substrate 114 are about the same as the surface areas occupied by the high-refractive areas 108 on the first substrate 106.

The high-refractive areas 108 are made of, for example, polymeric material. The refractive index of the high-refractive areas 108 is greater than the refractive index of the first substrate 106. In one embodiment, the refractive index of the high-refractive areas 108 is about 1.45 to about 1.80, and the light-refractive index of first substrate is about 1.25 to about 1.60. The thickness of the high-refractive areas 108 is greater than half of the width of the transparent area 112a. The brightness and contrast is increased as the thickness of the high-refractive areas 108 is increased. The rate of increasing brightness and contrast of LCD will be reduced when the thickness of the high-refractive areas 108 is greater than the width of the transparent area 112a. For example, the thickness of the high-refractive area 108 is about 5 μm to about 300 μm in one embodiment, and about 100 μm to about 200 μm in another embodiment.

Figure 1B:
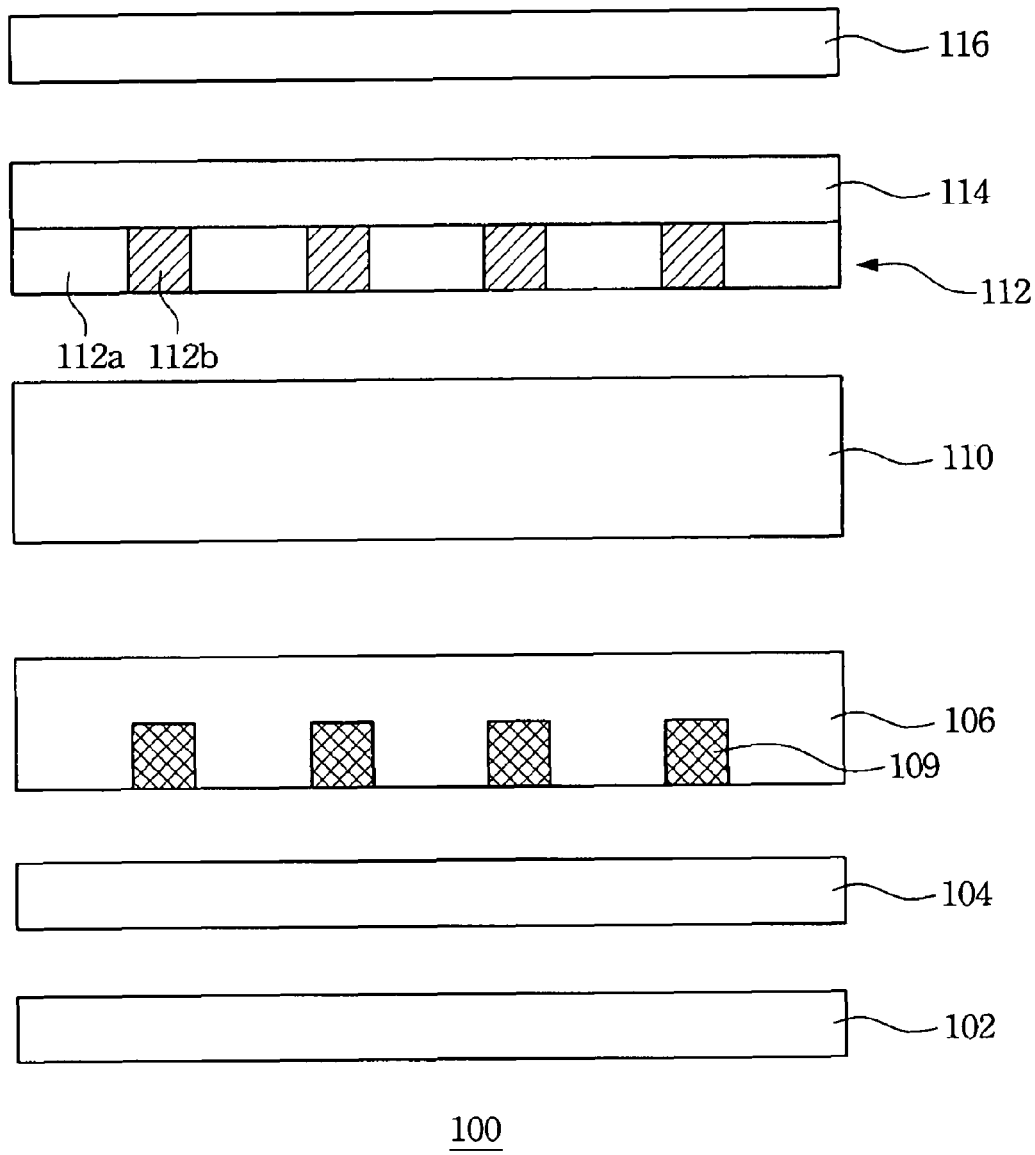

FIG. 1B is a cross-sectional diagram showing a variation of LCD in FIG. 1A. In FIG. 1B, according to the demands, the low-refractive areas 109, instead of high-refractive areas 108 in FIG. 1A, can be formed in the first substrate 106 right below the opaque areas 112b on the second substrate 114. The refractive index of the low-refractive areas 109 is smaller than the refractive index of the first substrate 106. In one embodiment of this invention, the refractive index of the low-refractive areas 109 is about 1.25 to about 1.60. For example, the thickness of the low-refractive area 109 is about 5 μm to about 300 μm in one embodiment, and about 100 μm to about 200 μm in another embodiment.

Embodiment 2

Figure 2A:
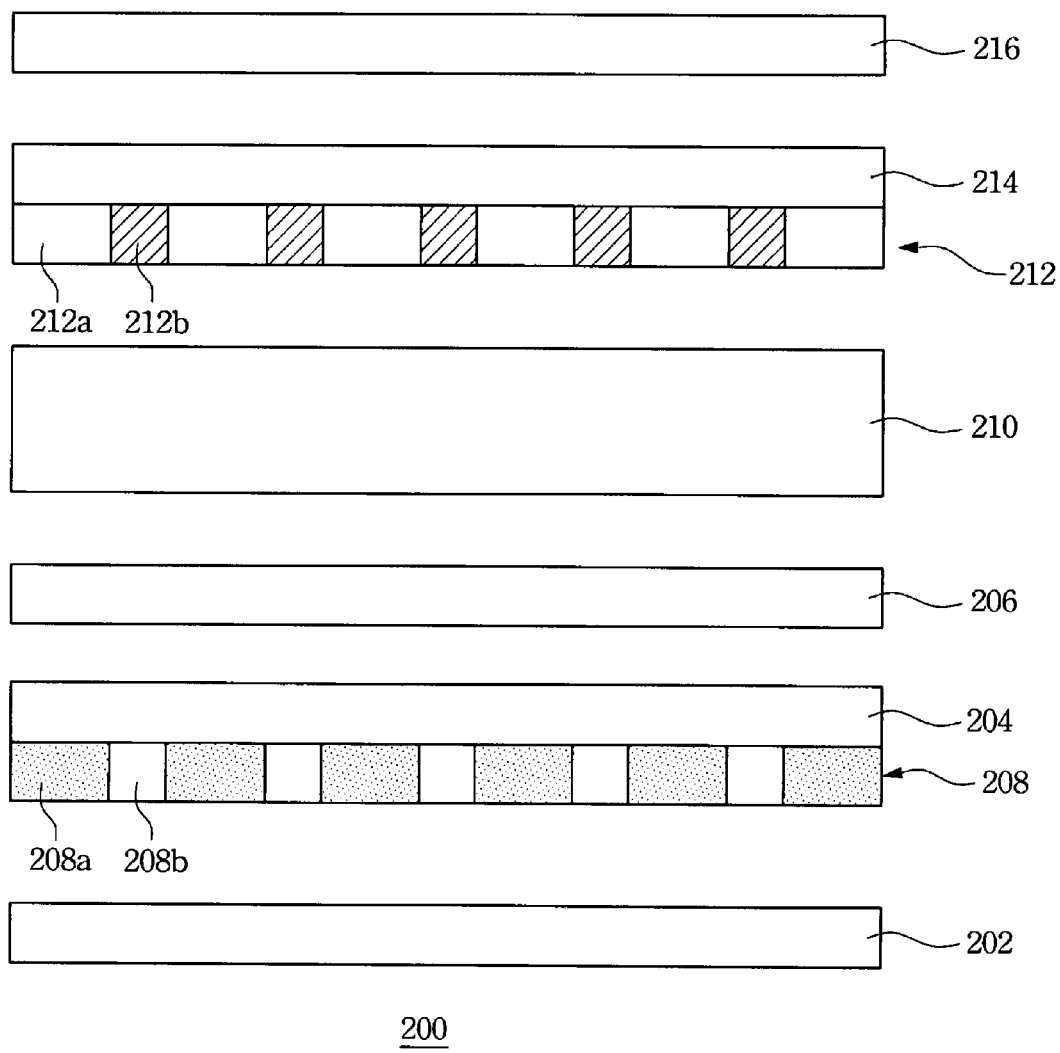
FIGS. 2A and 2B are cross-sectional diagrams showing LCDs according to another embodiment of this invention.

FIG. 2A is a cross-sectional diagram showing a LCD according to another embodiment of this invention. In FIG. 2A, a LCD 200 sequentially, from bottom to top, comprises a backlight module 202, a polymer layer 208, a first polarizer 204, a first substrate 206, a liquid crystal layer 210, a color filter layer 212, a second substrate 214 and a second polarizer 216. The color filter layer 212 comprises transparent areas 212a and opaque areas 212b. Each transparent area 212a is permeable to red light, green light or blue light.

The polymer layer 208 comprises plural high-refractive areas 208a, which are respectively located right below the transparent areas 212a, and plural low-refractive areas 208b, which are respectively located right below the opaque area 212b. The refractive index of the high-refractive areas 208a is greater than the refractive index of the low-refractive areas 208b. The surface areas occupied by the transparent areas 212a on the second substrate 214 are about the same as the surface areas occupied by the high-refractive areas 208a on the polymer layer 208.

The polymer layer 208 is made of, for example, polymeric material. A thickness of the polymer layer 208 is greater than half of the width of the transparent areas 212a. The brightness and the contrast is increased as the thickness of the polymer layer 208 is increased. The rate of increasing brightness and contrast of LCD will be reduced when the thickness of the polymer layer 208 is greater than the width of the transparent area 112a. For example, the thickness of the polymer layer 208 is about 5 μm to about 300 μm in one embodiment, and about 100 μm to about 200 μm in another embodiment. The refractive index of the high-refractive areas 208a is about 1.45 to about 1.80. The refractive index of the low-refractive areas 208b is about 1.25 to about 1.60. In one embodiment of this invention, the refractive index of the first polarizer 204 is greater than that of the high-refractive areas 208a to further improve light condensation.

Figure 2B:
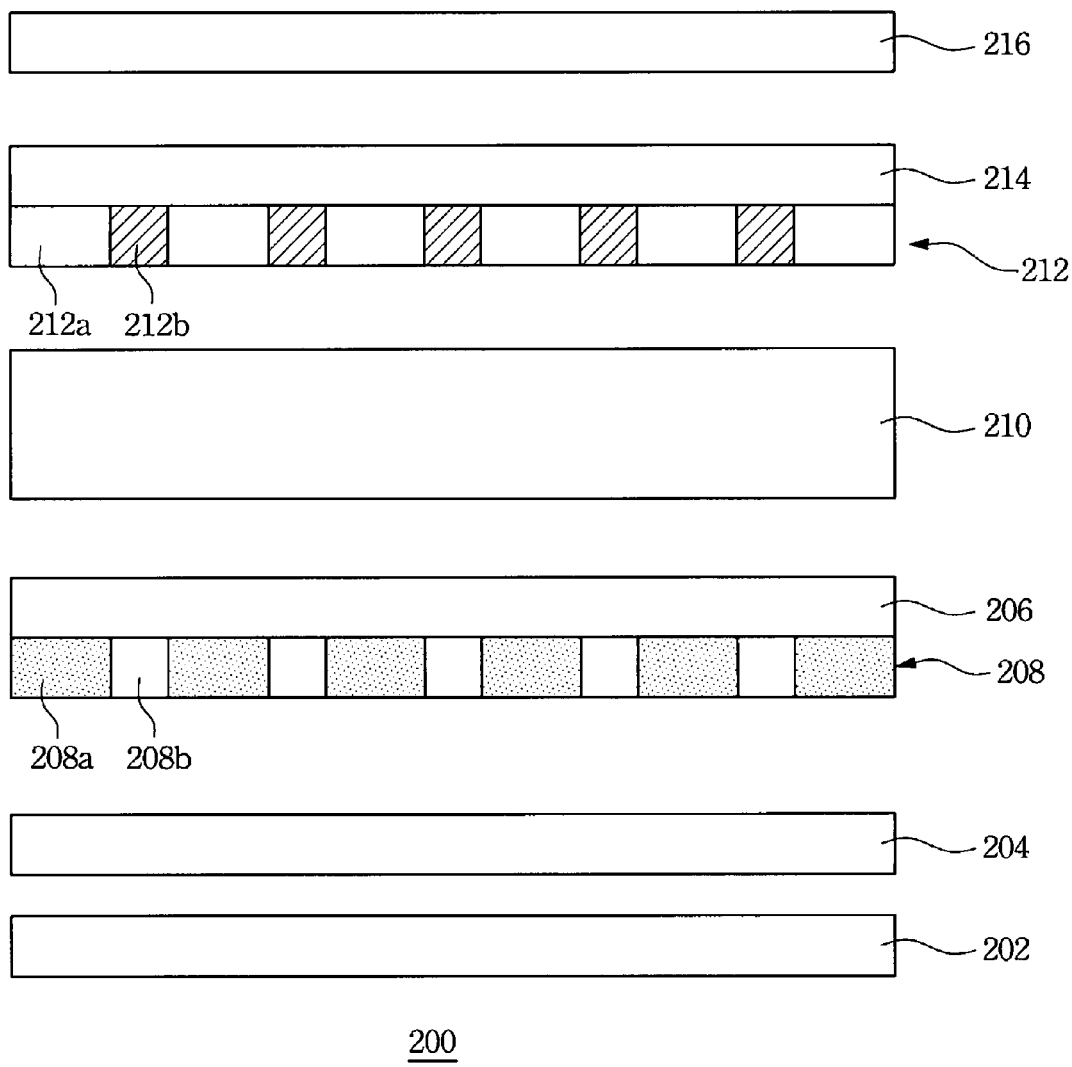

FIG. 2B is a cross-sectional diagram showing a variation of LCD in FIG. 2A. In FIG. 2B, the polymer layer 208 can be formed on a surface, facing the first polarizer 204, of the first substrate 206. In one embodiment of this invention, the refractive index of the first substrate 206 is greater than that of the high-refractive areas 208a to further improve light condensation.

Embodiment 3

Figure 3A:
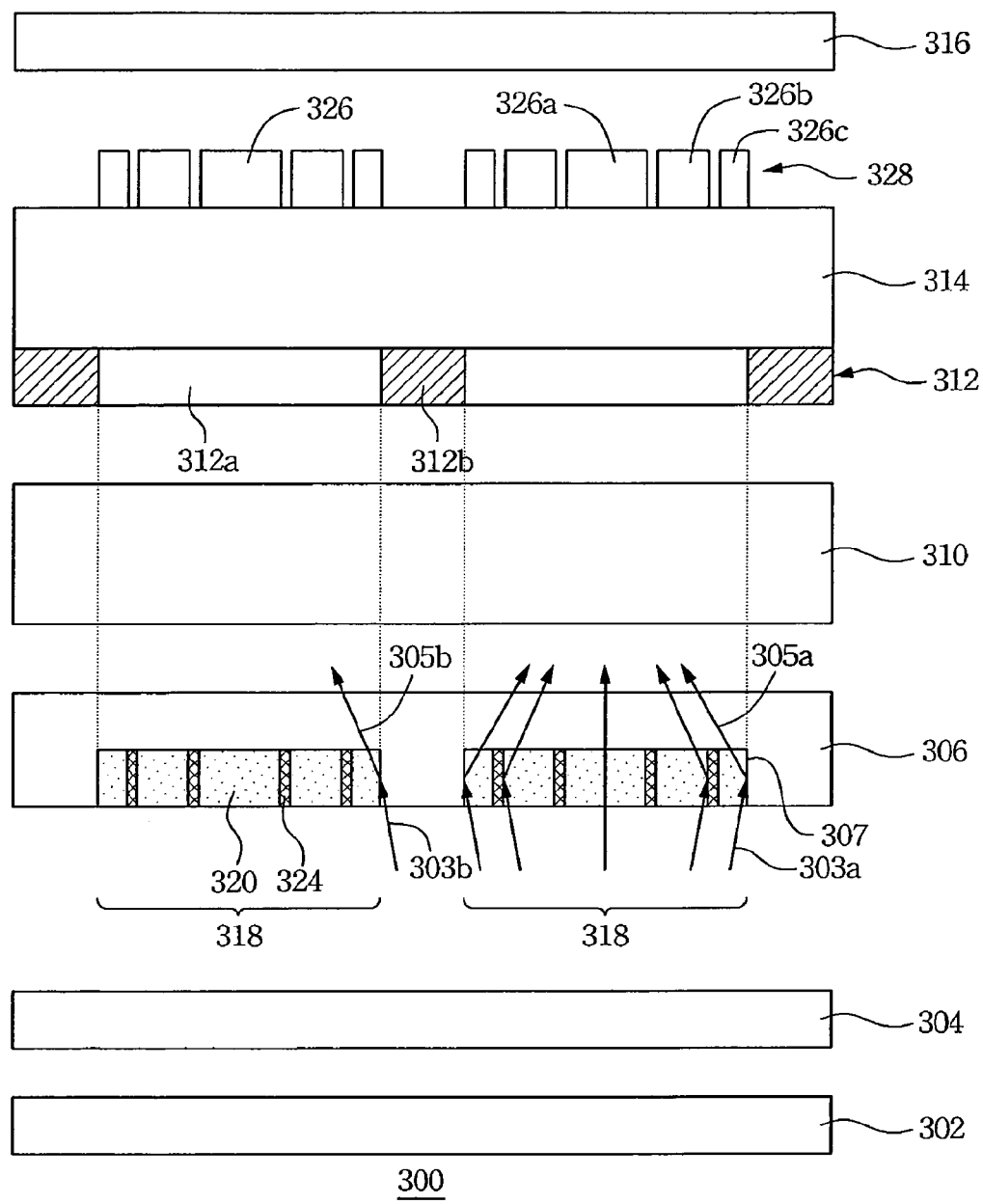
FIGS. 3A and 3C are cross-sectional diagrams showing LCDs according to another embodiment of this invention.

FIG. 3A is a cross-sectional diagram showing a LCD according to another embodiment of this invention. In FIG. 3A, a LCD 300 sequentially, from bottom to top, comprises a backlight module 302, a first polarizer 304, a first substrate 306, a liquid crystal layer 310, a color filter layer 312, a second substrate 314 and a second polarizer 316. The first substrate 306 comprises plural light-focusing arrays 318 on one surface, facing the first polarizer 304, of the first substrate 306. Each light-focusing array 318 comprises plural high-refractive areas 320 and plural low-refractive areas 324. The high-refractive area 320 includes a first high-refractive area 320a, second high-refractive areas 320b, and third high-refractive areas 320c (shown in FIG. 3B) having the same refractive index. The low-refractive areas 324 are disposed between the neighboring high-refractive areas 320. The color filter layer 312 comprises transparent areas 312a and opaque areas 312b. Each of the transparent areas 312a is permeable to red light, green light or blue light. The light-focusing arrays 318 are respectively located right below the transparent areas 312a of the color filter layer 312.

Figure 3B:
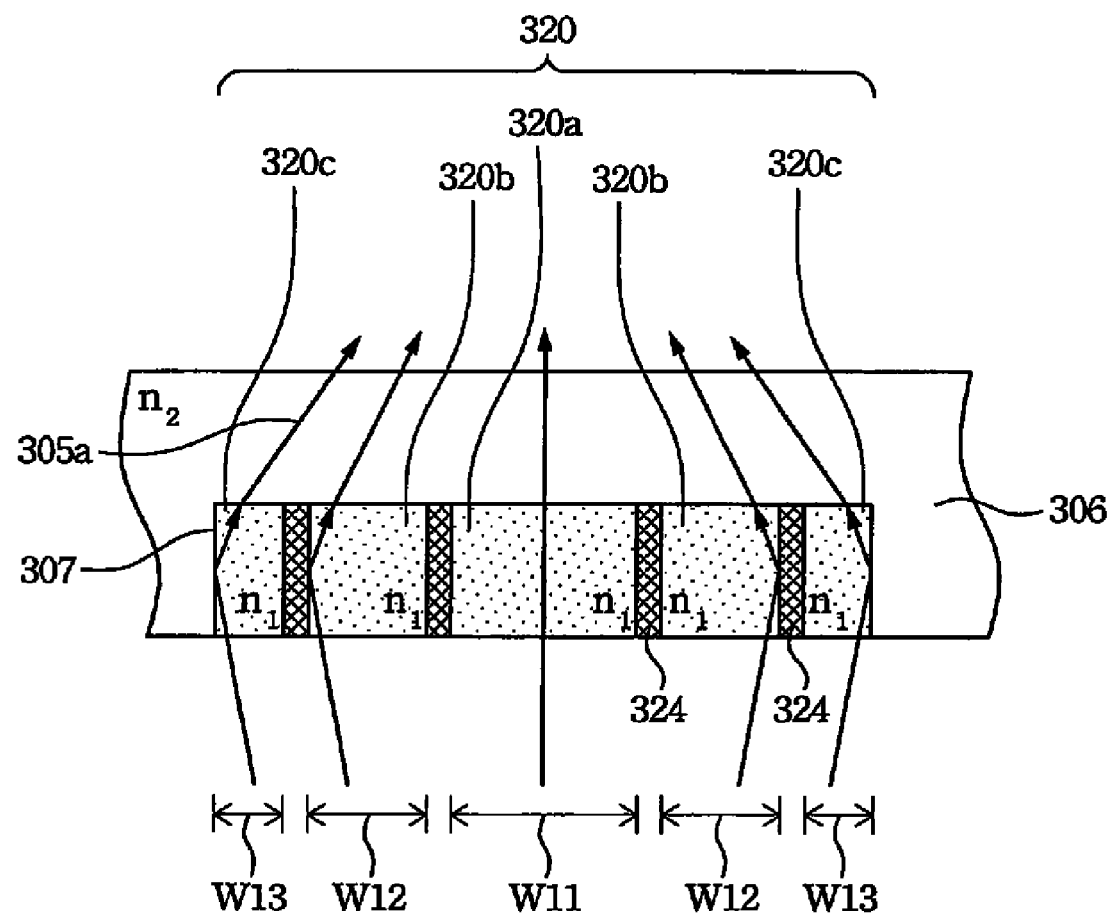
FIG. 3B is an enlarged diagram of one light-focusing array in FIG. 3A.
Figure 3C:
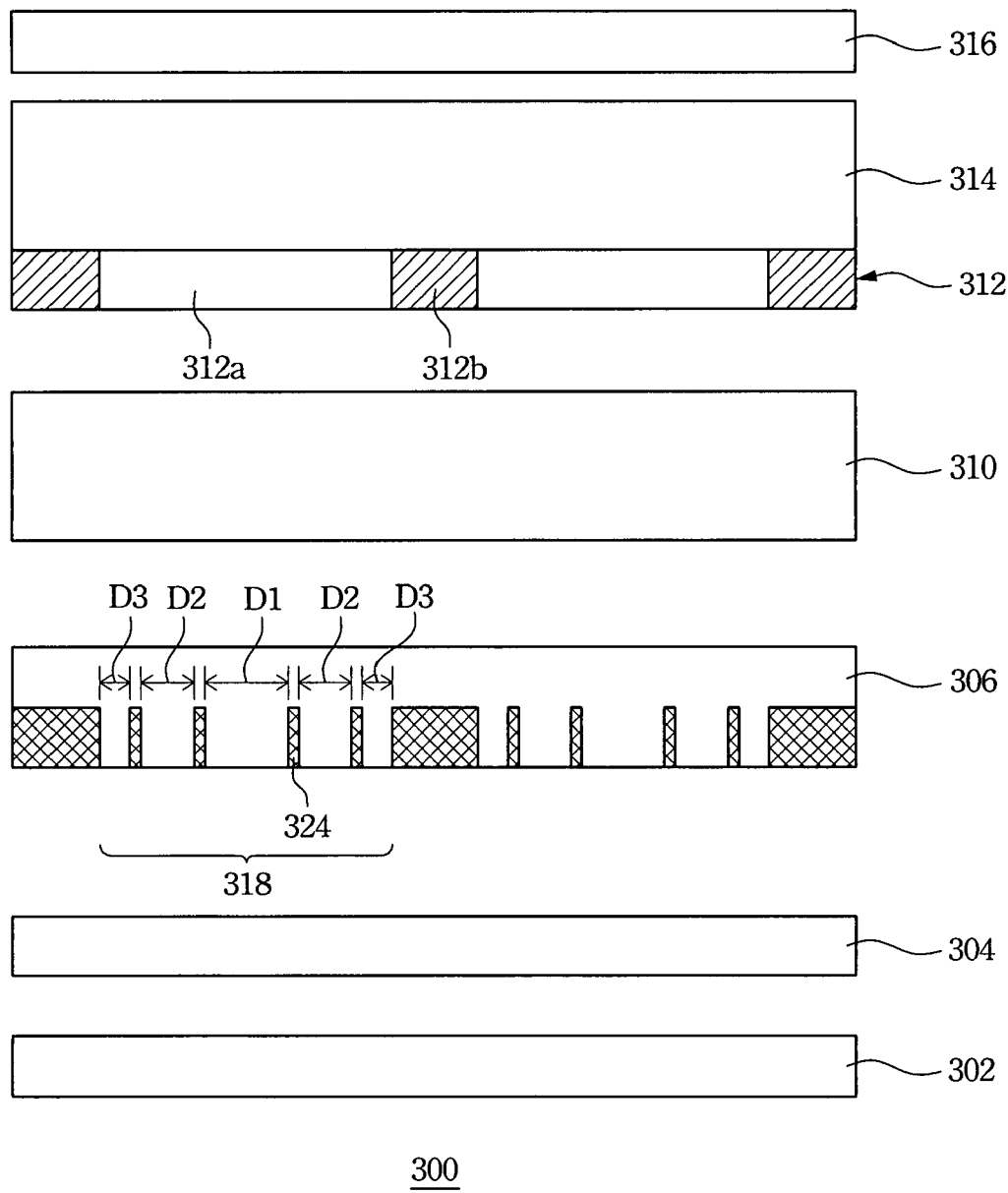

FIG. 3B is an enlarged diagram of one light-focusing array 318 in FIG. 3A. In FIG. 3B, the second high-refractive areas 320b are located symmetrically on two sides of the first high-refractive area 320a, and the third high-refractive areas 320c are symmetrically located on two outer sides of the second high-refractive areas 320b. The widths of the low-refractive areas 324 between these neighboring high-refractive areas 320 are equal. The widths of the first high-refractive area 320a (W11), the second high-refractive areas 320b (W12), and the third high-refractive areas 320c (W13) are sequentially decreased, i.e. W11>W12>W13. In one embodiment of this invention, W11: W12: W13 is about 9:4:1.

The high-refractive areas 320 are made of, for example, polymeric material when the low-refractive areas 324 are made of the first substrate 306, or the low-refractive areas 324 are made of polymer when the high-refractive areas 320 are made of the first substrate 306. The refractive index of high-refractive areas 320 is greater than the refractive index of the first substrate 306. The refractive index of the first substrate 306 is greater than the refractive index of the low-refractive areas 324. The refractive index of the low-refractive areas 324 is smaller than the refractive index of the high-refractive areas 320. In one embodiment, the refractive index of high-refractive areas 320 is about 1.40 to about 1.80, and the refractive index of the first substrate 306 is about 1.20 to about 1.55, and the refractive index of the low-refractive areas is about 1.25 to about 1.60. The thickness of the high-refractive areas 320 is greater than half of the width of the transparent area 312a. The brightness and contrast is increased as the thickness of the high-refractive areas 320 is increased. The rate of increasing brightness and contrast of LCD will be reduced when the thickness of the high-refractive areas 320 is greater than the width of the transparent area 112a. For example, the thickness of high-refractive areas 320 is about 5 µm to about 300 µm in one embodiment, and about 100 µm to about 200 µm in another embodiment.

The refractive index of the low-refractive areas 324 is smaller than that of the first substrate 306. In one embodiment of this invention, the refractive index of the low-refractive areas 324 is about 1.25 to about 1.60.

Refer to FIG. 3A. The second substrate 314 can optionally comprise light-defocusing arrays 328 to further increase the brightness of LCD. Each light-defocusing array 328 comprises plural low-refractive areas 326 including a first low-refractive area 326a, a second low-refractive areas 326b, and a third low-refractive areas 326c arranged as same as the high-refractive areas 320. The refractive index of the low-refractive areas is smaller than that of the second substrate 314. In one embodiment of this invention, the refractive index of the low-refractive areas 326 of the light-defocusing arrays 328 is about 1.00 to about 1.20, and the refractive index of the second substrate 314 is about 1.20 to about 1.40. Each of the low-refractive areas 326 is located right above the each of the high refractive areas 320 and has the same shape as each of the high-refractive areas 320. The widths and lengths of these low-refractive areas 326 are also the same as those of the high-refractive areas 320. The second low-refractive areas 326b are located symmetrically on two sides of the first low-refractive area 326a, and the third low-refractive areas 326c are symmetrically located on two outer sides of the second low-refractive areas 326b. The intervals between these neighboring low-refractive areas 326 are equal. The widths of the first low-refractive area 326a, the second low-refractive areas 326b, and the third low-refractive areas 326c are sequentially decreased.

Embodiment 4

Figure 4A:
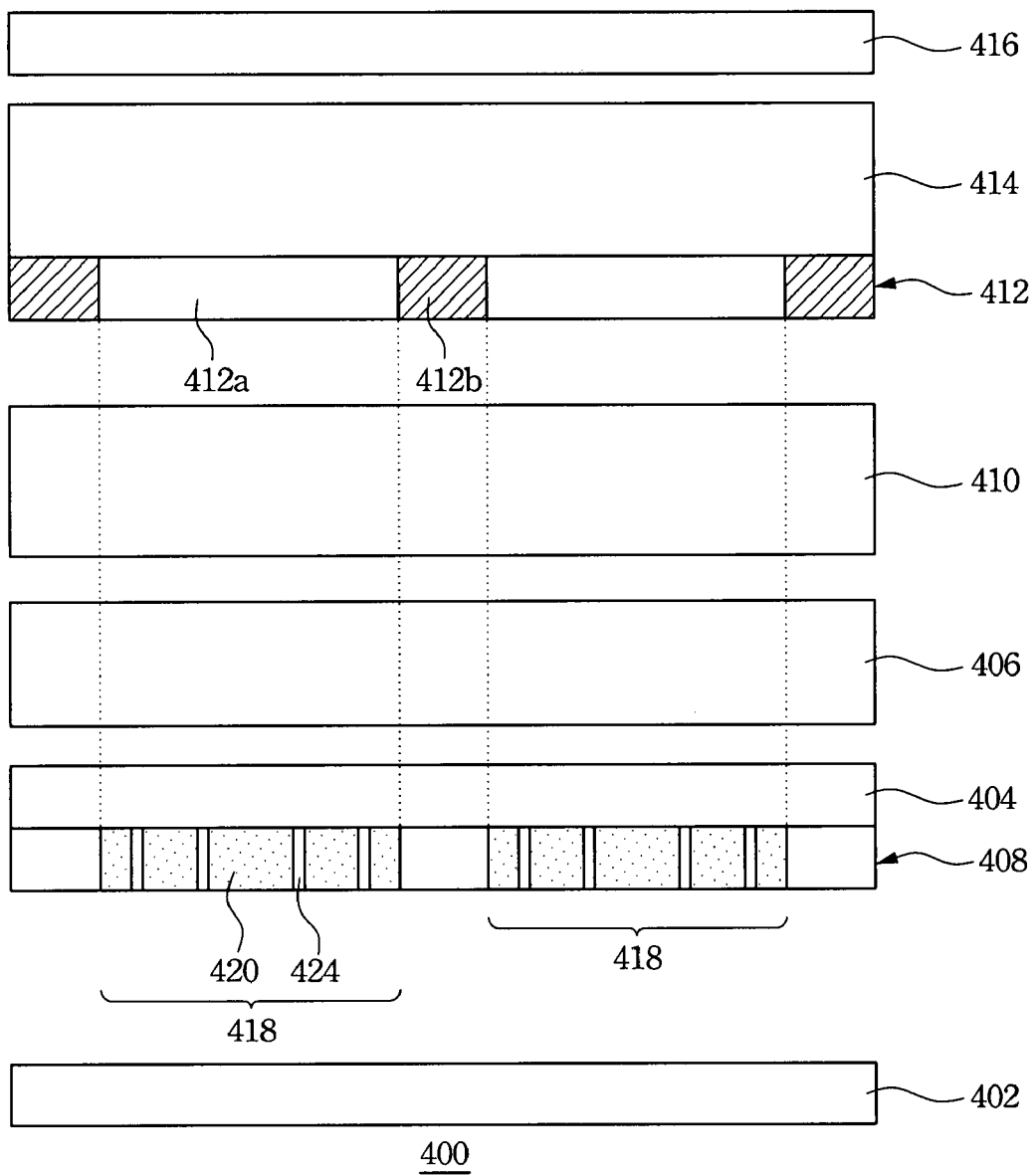
FIGS. 4A and 4C are cross-sectional diagrams showing LCDs according to another embodiment of this invention.

FIG. 4A is a cross-sectional diagram showing a LCD according to another embodiment of this invention. In FIG. 4A, a LCD 400 sequentially, from bottom to top, comprises a backlight module 402, a polymer layer 408, a first polarizer 404, a first substrate 406, a liquid crystal layer 410, a color filter layer 412, a second substrate 414, and a second polarizer 416. The color filter layer 412 comprises transparent areas 412a and opaque areas 412b. Each of the transparent areas 412a are permeable to red light, green light or blue light.

The polymer layer 408 comprises plural light-focusing arrays 418, which are located right below the transparent areas 412a. Each light-focusing array 418 comprises plural high-refractive areas 420, including a first high-refractive area 420a, second high-refractive areas 420b, and third high-refractive areas 420c (shown in FIG. 4B), and low-refractive areas 424. The refractive index of the high-refractive areas 420 is greater than that of the low-refractive areas 424.

Figure 4B:
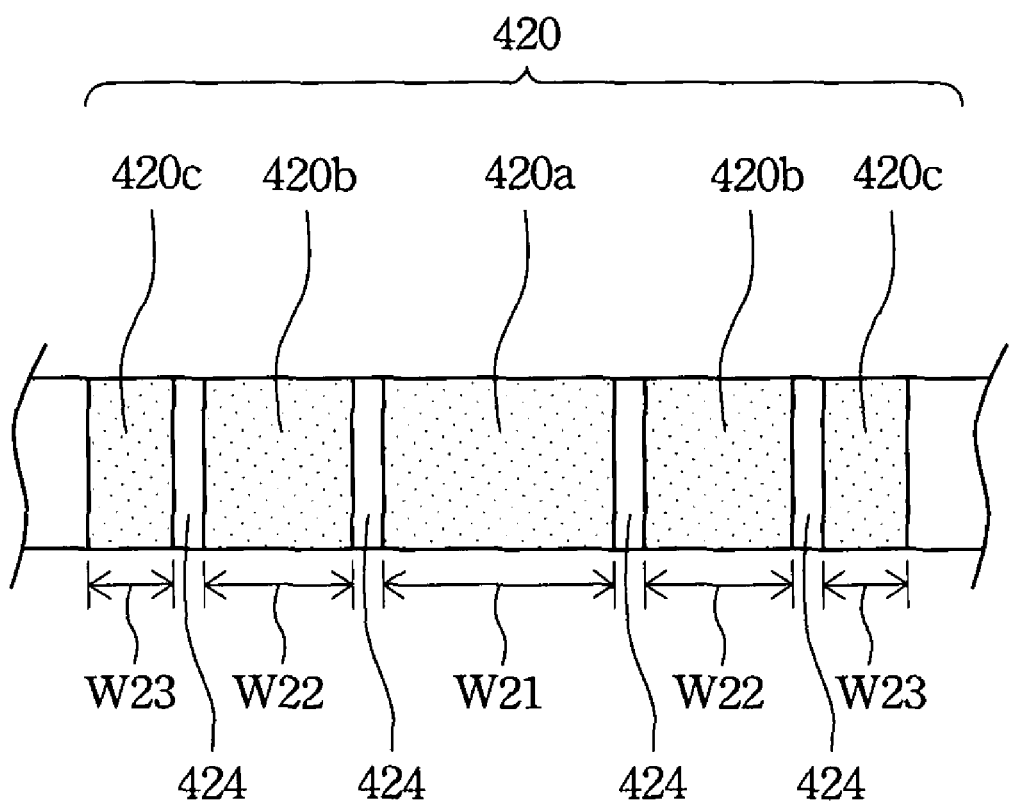
FIG. 4B is an enlarged diagram of one light-focusing array in FIG. 4A.

FIG. 4B is an enlarged diagram of one light-focusing array 418 in FIG. 4A. In FIG. 4B, the second high-refractive areas 420b are located symmetrically on two sides of the first high-refractive area 420a, and the third high-refractive areas 420c are symmetrically located on two outer sides of the second high-refractive areas 420b. The widths of the first high-refractive area 420a (W21), the second high-refractive areas 420b (W22), and the third high-refractive areas 420c (W23) are sequentially decreased, i.e. W21>W22>W23. In one embodiment of this invention, W21:W22:W23 is about 9:4:1. The width of the low-refractive 424 is equal to each other.

The polymer layer 408 is made of, for example, polymeric material. The thickness of the polymer layer 408 is greater than half of the width of the transparent areas 412a. The brightness and contrast is increased as the thickness of the polymer layer 408 is increased. The rate of increasing brightness and contrast of LCD will be reduced when the thickness of the high-refractive areas 408 is greater than the width of the transparent area 112a. For example, a thickness of the polymer layer 408 is about 5 µm to about 300 µm. The refractive index of the high-refractive areas 420 is about 1.45 to about 1.80. The refractive index of the low-refractive areas 424 is about 1.25 to about 1.60. In one embodiment of this invention, the refractive index of the first polarizer 404 is greater than that of the high-refractive areas 420 to further improve light condensation.

Figure 4C:
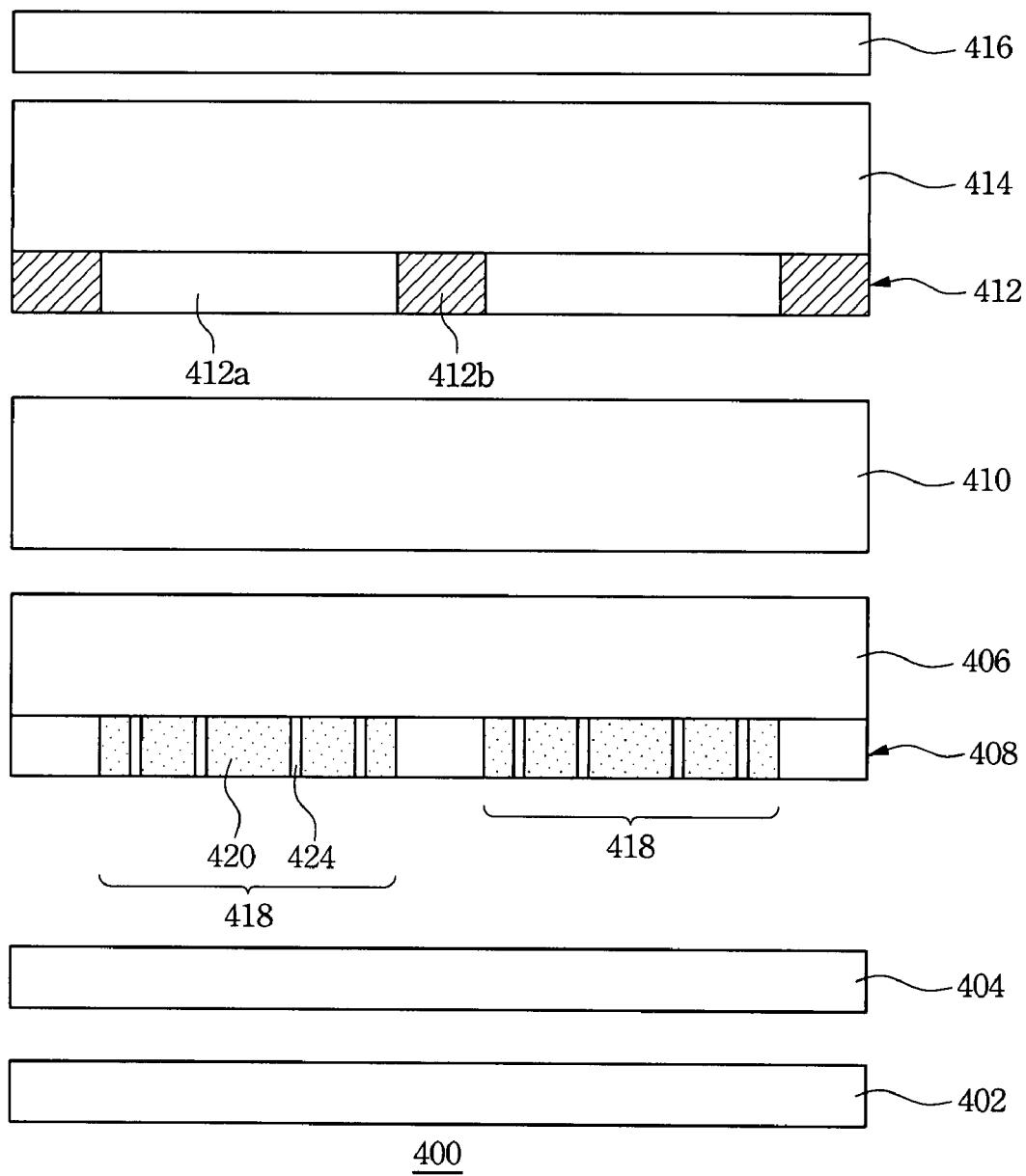

FIG. 4C is a cross-sectional diagram showing a variation of LCD in FIG. 4A. In FIG. 4C, the polymer layer 408 can be formed on a surface, facing the first polarizer 404, of the first substrate 406. In one embodiment of this invention, the refractive index of the first substrate 406 is greater than that of the high-refractive areas 420 to further improve light condensation.

Embodiment 5

Figure 5A:
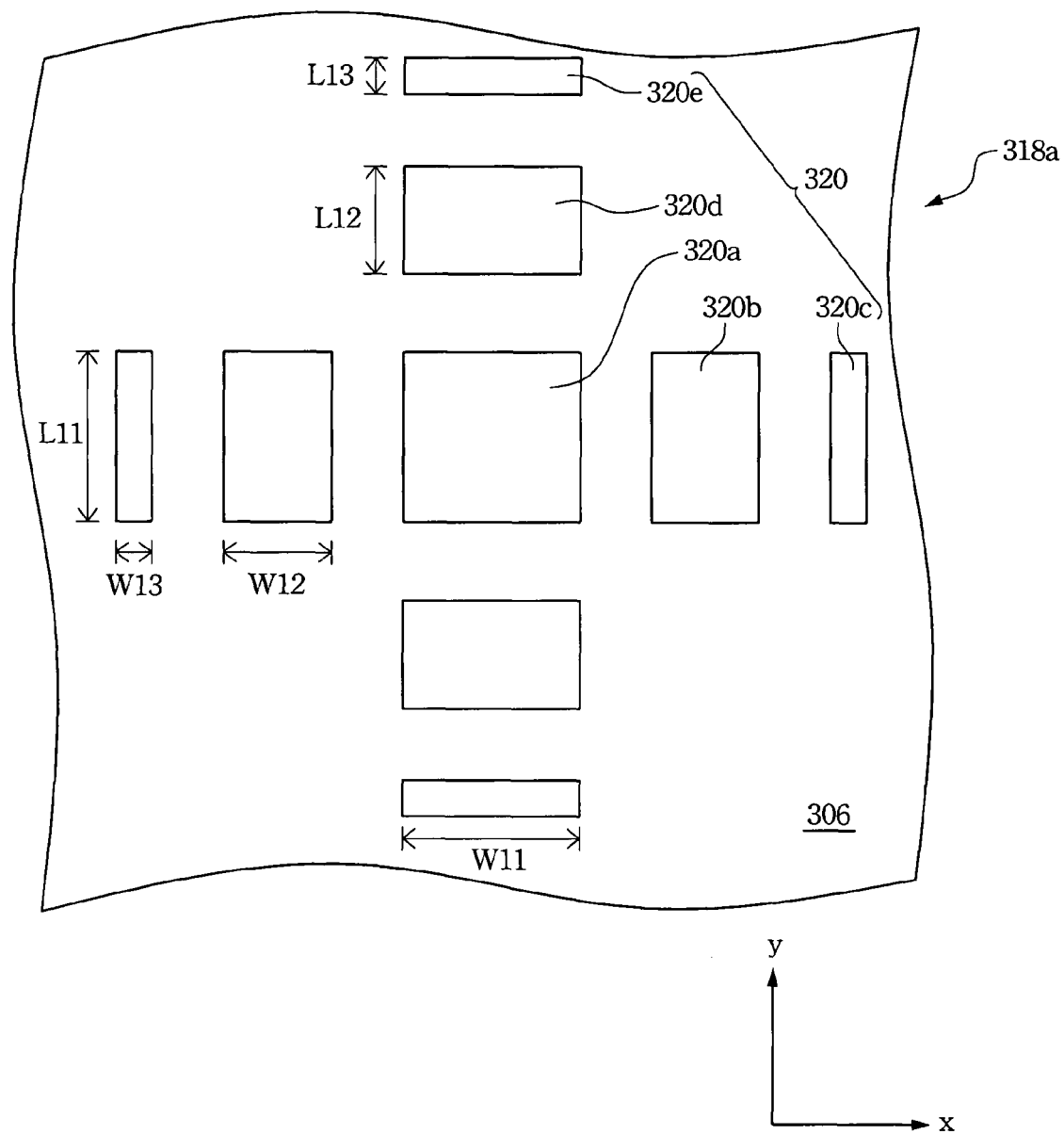
FIG. 5A is a vertical diagram showing a two-dimensional light-focusing array on the first substrate in FIG. 3A.

FIG. 5A is a vertical diagram showing a two-dimensional light-focusing array on the first substrate in FIG. 3A. The one-dimensional light-focusing arrays 318 on the first substrate 306 in FIG. 3A can also be modified to a two dimensional light-focusing array 318a in FIG. 5A to further increase the brightness of LCD. In FIG. 5A, the light-focusing array 318a comprises plural high-refractive areas 320 arranged in two dimensions to form a cross.

The high-refractive areas 320 include a high-refractive area 320a, second high-refractive areas 320b, third high-refractive areas 320c, fourth high-refractive areas 320d, and fifth high-refractive areas 320e having the same refractive index. In the x-direction, the second high-refractive areas 320b are located symmetrically on two sides of the first high-refractive area 320a, and the third high-refractive areas 320c are symmetrically located on two outer sides of the second high-refractive areas 320b. In the y-direction, the fourth high-refractive areas 320d are located symmetrically on two sides of the first high-refractive area 320a, and the fifth high-refractive areas 320e are symmetrically located on two outer sides of the fourth high-refractive areas 320d.

The width and the length of the first high-refractive area 320a are W11 and L11, respectively. The length of the second high-refractive areas 320b and the third high-refractive areas 320c are the same as that of the first high-refractive areas 320a. The width of the second high-refractive areas 320b (W12) is smaller than the width of the first high-refractive area 320a (W11) and greater than the width of the third high-refractive areas 320c (W12), i.e. W11>W12>W13.

The width of the fourth high-refractive areas 320d and the fifth high-refractive areas 320e are the same as that of the first high-refractive areas 320a. The length of the fourth high-refractive areas 320d (L12) is smaller than the width of the first high-refractive area 320a (L11) and greater than the width of the fifth high-refractive areas 320e (L12), i.e. L11>L12>L13.

Similarly, the high-refractive areas 420 in FIGS. 4A-4C can also be arranged in a two-dimensional array similar to that of the high-refractive areas 320 in FIG. 5A.

Figure 5B:
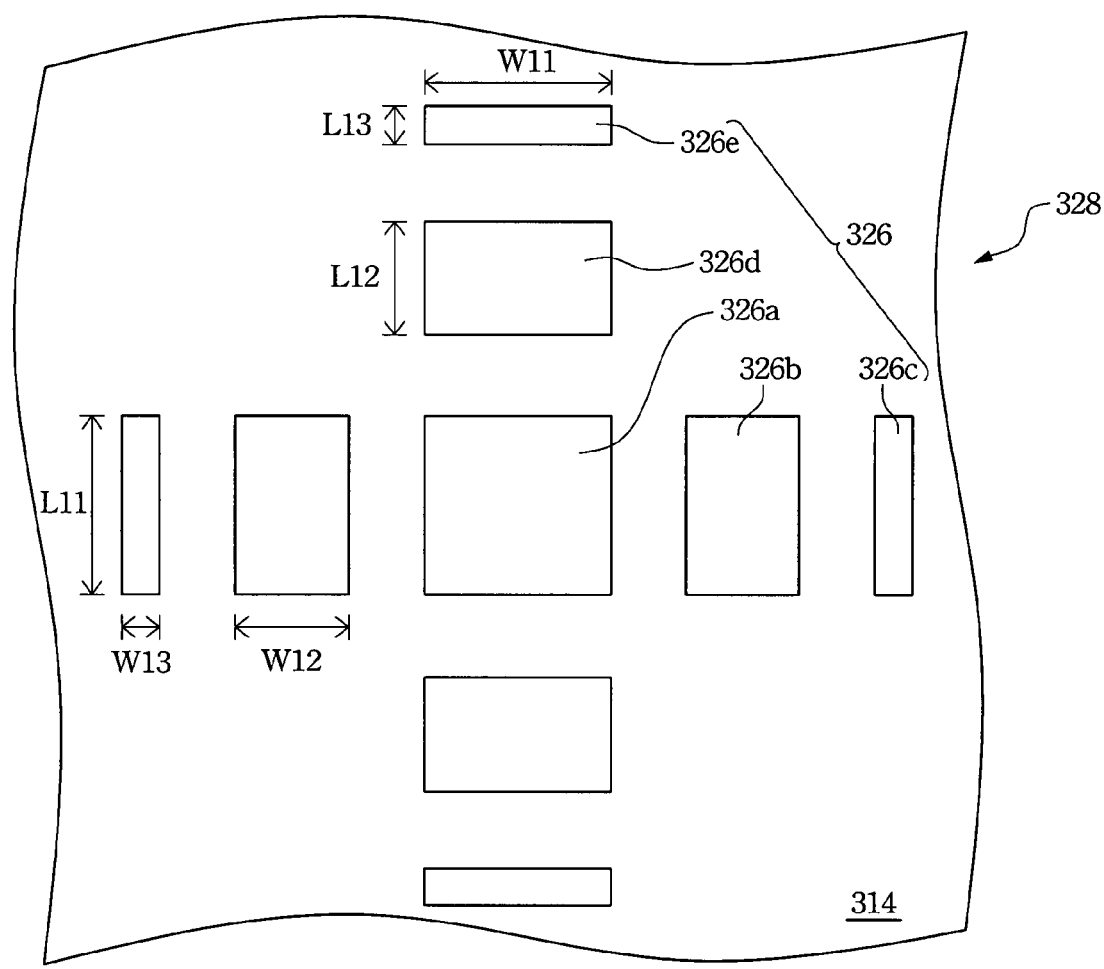
FIG. 5B is a vertical diagram showing a light-defocusing array on the second substrate in FIG. 3A.

FIG. 5B is a vertical diagram showing light-defocusing arrays on the second substrate in FIG. 3A. The second substrate 314 in FIG. 3A can further comprise light-defocusing arrays 328 right above transparent areas 312a to further increase the brightness of LCD. Each light-defocusing array 328 comprises plural low-refractive areas 326 including a first low-refractive area 326a, second low-refractive areas 326b, third low-refractive areas 326c, fourth low-refractive areas 326d, and low-refractive areas 326e arranged as same as the high-refractive areas 320 in FIG. 5A. The refractive index of the low-refractive areas is smaller than that of the second substrate 314. In one embodiment of this invention, the refractive index of the low-refractive areas 326 is about 1.00 to about 1.20, and the refractive index of the second substrate 314 is about 1.20 to about 1.40. The widths and lengths of these low-refractive areas 326 are also the same as those of the high-refractive areas 320 in FIG. 5A.

Similarly, in FIGS. 4A-4C, a polymer layer having light-defocusing arrays similar to that of the light-defocusing arrays 328 can also be formed on the second substrate 414 to increase the brightness of the LCD 400.

Explanation of Light-Focusing Effect

Figure 6A:
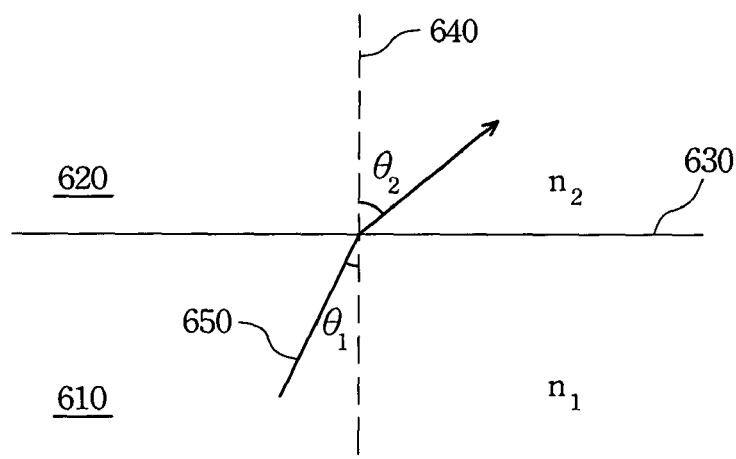
FIGS. 6A to 6C are diagram showing a light moving from a first media to a second media with various incident angles.

According to Snell's Law, as light passes an interface between two media, depending upon the relative refractive indices of the two media, the light will either be refracted to a smaller angle, or a greater angle. These angles are measured with respect to the normal line perpendicular to the interface. Please refer to FIG. 6A, FIG. 6A is a diagram showing a light moving from a first medium 610 to a second medium 620. According to FIG. 6A, Snell's Law can be expressed as the following formula:

$$n_1 \sin \theta_1 = n_2 \sin \theta_2 \quad (1)$$

The $n_1$ and $n_2$ are the refractive indices of the first medium 610 and the second medium 620 on two sides of the interface 630, and the $\theta_1$ and $\theta_2$ are incident angle and refraction angle with respect to the normal line 640, respectively, when light 650 travels from the first media 610 to the second media 620. In FIG. 6A, the first media 610 is denser than the second media 620, i.e. $n_1 > n_2$.

Figure 6B:
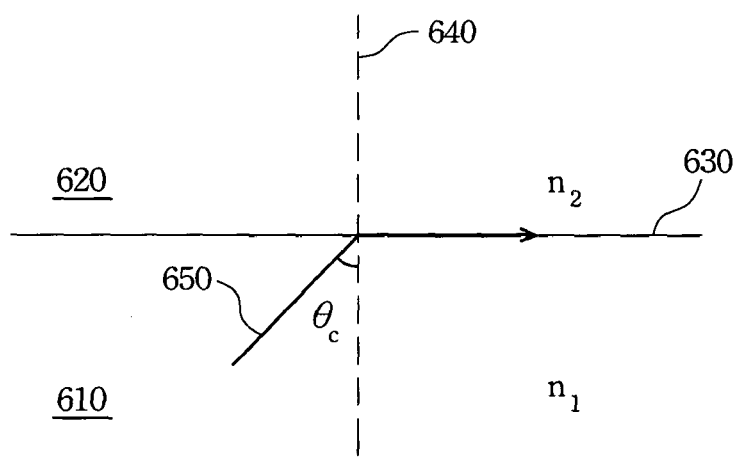

When $\theta_1$ is gradually increased to $\theta_c$, as shown in FIG. 6B, the light 650 undergoes refraction and travels along the interface 630. The critical angle $\theta_c$ can be calculated by the following formula:

$$\theta_c = \sin^{-1}(n_2/n_1) \quad (2)$$

Figure 6C:
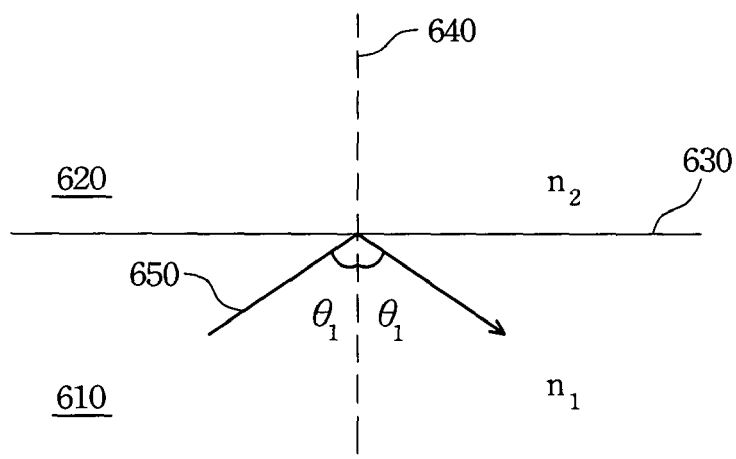

When $\theta_1$ is larger than $\theta_c$, as shown in FIG. 6C, the light 650 is totally reflected from the interface 630. This is the so-called "total reflection" in optics.

According to embodiments 1 and 2 (FIGS. 1A-2B), The way to refract or reflect light, on the basis of the Snell's Law, to the transparent areas of the color filter layer in LCD is to dispose areas having higher refractive index right below the transparent areas. For example, in FIG. 1A, light from the backlight module 102 passes through the first polarizer 104 first. Then, after the incident light 103a travels across the high-refractive areas 108, the light 105a is reflected by the interfaces 107, between the high-refractive areas 108 and the first substrate 106, when the incident angle of the incident light 103a is larger than the critical angle, $\theta_c$. After that, the light 105a continuously passes through the first substrate 106, the liquid crystal layer 110, the transparent areas 112a of the color filter layer 112, the second substrate 114, and the second polarizer 116 in sequence.

Therefore, the incident light 103a can be condensed to pass through the transparent areas 112a, and the light loss can be reduced by decreasing the light passing through the opaque areas 112b. Consequently, the utilization of light from the backlight module 102 can be improved so as to enhance the brightness and the contrast of LCD.

Furthermore, referring to FIG. 1A, the incident light 103b, passing through the first substrate 106 having lower refractive index, also can be refracted by the interface 107 between the high-refractive areas 108 and the first substrate 106. Hence, the refracted light 105b can be more effectively centralized to the transparent areas 112a of the color filter layer 112 to enhance the brightness of the LCD.

According to the embodiments 3-5 (FIGS. 3A-5A), The way to refract or reflect light, on the basis of the Snell's law, to the transparent areas of the color filter layer in LCD is also to dispose light-focusing arrays right below the transparent areas. For example, in FIGS. 3A and 3B, the light-focusing array 318 comprises plural high-refractive areas 320 to increase the numbers of the interface 307 between the high-refractive areas 320 and the first substrate 306. In light of the arrangement of the high-refractive areas 320 as described above, after the incident light 303a passes through those high-refractive areas 320, the totally reflected light 305a can be further centralized to the transparent areas 312a. As for the incident light 303b, passing through the first substrate 106 having lower refractive index, also can be refracted by the interface 307 between the high-refractive areas 320 and the first substrate 306. Hence, the refracted light 305b can be more effectively centralized to the transparent areas 312a of the color filter layer 312 to further enhance the brightness of the LCD.

Method of Fabricating Light-Refractive Areas in a Substrate

In Embodiments 1, 3, and 5, light-refractive areas, including high-refractive areas or low-refractive areas, are formed in the first substrate or the second substrate. The methods of fabricating light-refractive areas in a substrate are described as follows.

Figure 7A:
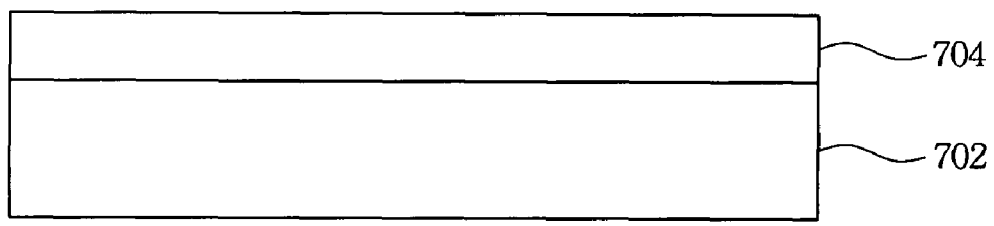
FIGS. 7A to 7E are cross-sectional diagrams showing high-refractive areas formed in a substrate according to one embodiment of this invention.
Figure 7B:
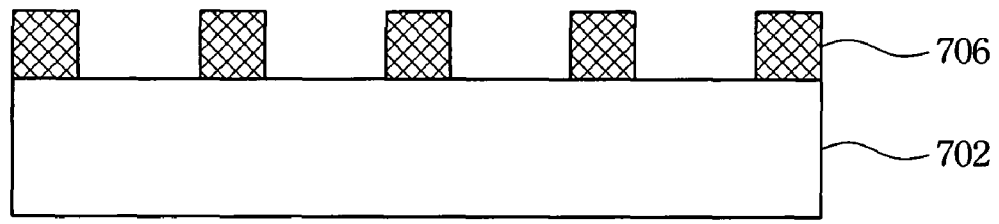
Figure 7C:
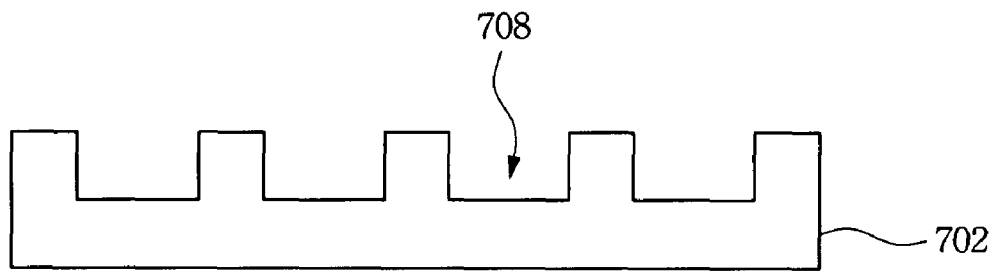

For example, FIGS. 7A to 7E are cross-sectional diagrams illustrating the steps of forming light-refractive areas in a substrate according to an embodiment of the invention. In FIG. 7A, a photoresist layer 704 is formed on a substrate 702. Then, in FIG. 7B, a photolithography process is performed on the photoresist layer 704 to form a patterned photoresist 706. In FIG. 7C, the exposed part of the substrate 702 is etched to form trenches 708 in the substrate 702. After that, the patterned photoresist 706 is removed.

Figure 7D:
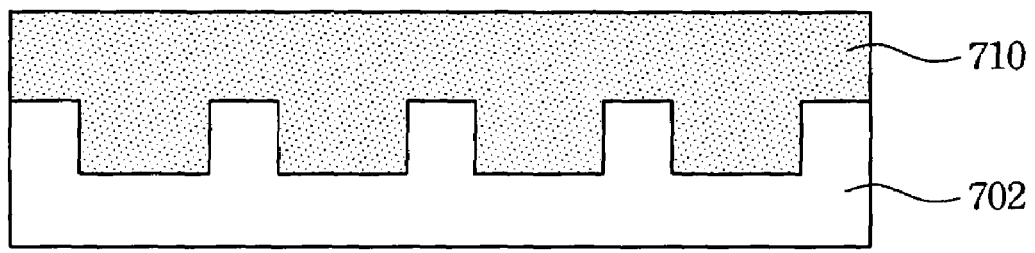
Figure 7E:
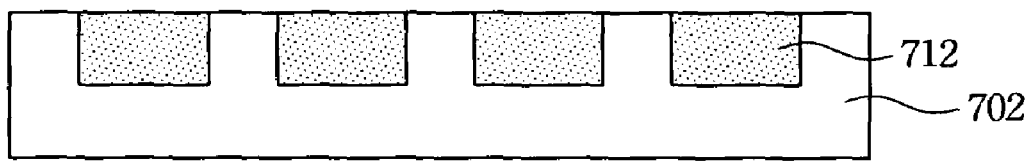

In FIG. 7D, a polymeric material 710 is formed in the trenches 708 and on the substrate 702 by a spin coating process and then cured by UV light. The refractive index of the polymer material 710 can be greater or lower than the refractive index of the substrate 702. In FIG. 7E, an etching process and a polishing process are performed to remove the polymeric material 710 higher than the level of the substrate 702 and then plural light-refractive areas 712 are formed.

Figure 8A:
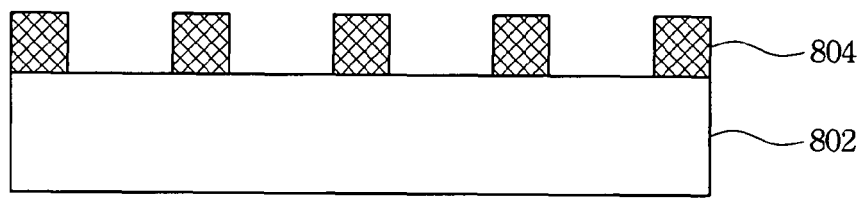
FIGS. 8A to 8D are cross-sectional diagrams showing high-refractive areas formed in a substrate according to another embodiment of this invention.
Figure 8B:
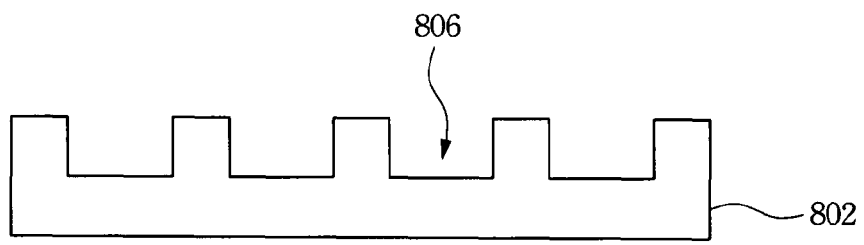

FIGS. 8A to 8D are cross-sectional diagrams illustrating the steps of forming light-refractive areas in a substrate according to another embodiment of the invention. In FIG. 8A, a photoresist layer is formed on a substrate 802 and a photolithography process is performed on the photoresist layer to form a patterned photoresist 804. In FIG. 8B, the exposed part of the substrate 802 is etched to form trenches 806 in the substrate 802. After that, the patterned photoresist 804 is removed.

Figure 8C:
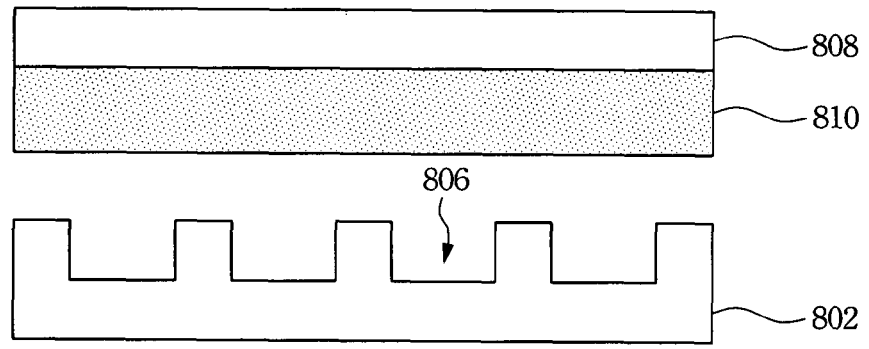

In FIG. 8C, an adhesive layer 810 is coated on a polarizer 808. The material of the adhesive layer 810 is polymer and the thickness of the adhesive layer 810 is greater than the depth of the trenches 506, such as about 8 μm to about 300 μm in one embodiment, and about 100 μm to about 200 μm in another embodiment. The refractive index of the adhesive layer 810 is greater or smaller than the refractive index of the substrate 802.

Figure 8D:
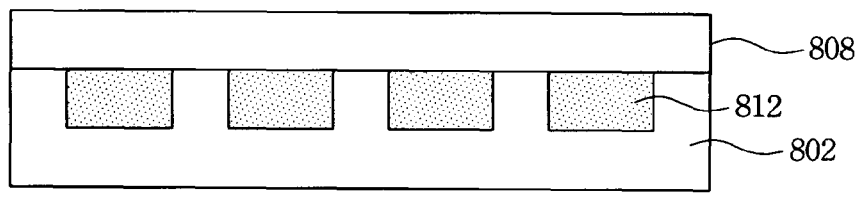

In FIG. 8D, the polarizer 808 is adhered to the substrate 802 through the adhesive layer 810. Therefore, light-refractive areas 812 can be formed in the substrate 802.

Method of Forming Polymer Layer Having Light-Refractive Areas Therein

Figure 9A:
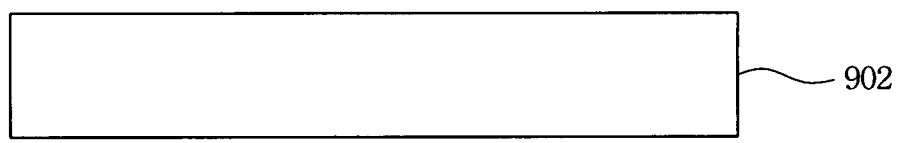
FIGS. 9A to 9D are cross-sectional diagrams showing high-refractive areas formed in a substrate according to another embodiment of this invention.
Figure 9B:
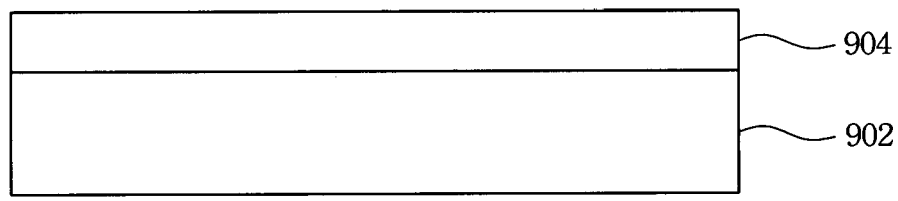

FIGS. 9A to 9D are cross-sectional diagrams illustrating the steps of forming light-refractive areas on a substrate according to another embodiment of the invention. In FIG. 9A, a substrate 902 is provided. Then, a polymer layer 904 is formed on the substrate 902 by a spin coating process in FIG. 9B. The polymer layer 904 can also be formed by other methods.

Figure 9C:
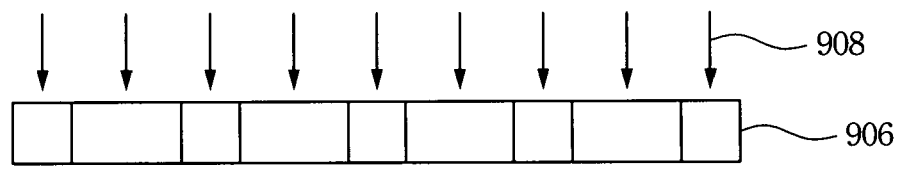
Figure 9D:
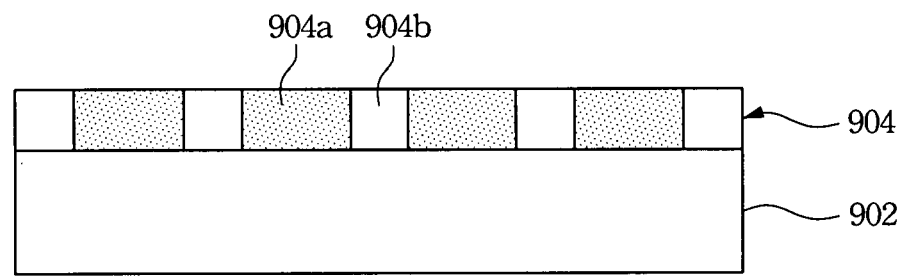

In FIG. 9C, the polymer layer 904 is exposed to light 908 through a photomask 906 to form high-refractive areas 904a and low-refractive areas 904b in FIG. 9D. The high-refractive areas 904a and the low-refractive areas 904b having different refractive indices are obtained by adjusting the exposure time and exposure intensity used on the polymer layer 904.

Alternatively, a polymer layer can also be formed on a polarizer to form high-refractive areas and low-refractive areas on the polarizer according to the demands.

According to the embodiments of this invention, brightness and contrast of a LCD can be increased by condensing light to the transparent areas of the color filter layer and decreasing light leakage through the opaque areas of the color filter. Furthermore, the number of brightness-enhanced films can also be decreased to reduce the cost.

Embodiments of this invention described above should not be regarded as limitations. It will be apparent to those people skilled in the art that various modifications and variations can be made to an embodiment of this invention without departing from the scope or spirit of an embodiment of this invention. The scope of an embodiment of this invention is as defined in the appended claims.

What is claimed is:

1. A high brightness liquid crystal display, the liquid crystal display comprising:
a backlight module;
a first polarizer on the backlight module;
a first substrate on the first polarizer, wherein a surface, which faces the backlight module, of the first substrate comprises a plural light-focusing arrays comprising a plural high-refractive areas, each of the high-refractive areas comprises:
a first high-refractive area;
two second high-refractive areas disposed on both sides of the first high-refractive area symmetrically, wherein the widths of the second high-refractive areas are [the same and] smaller than the width of the first high-refractive area; and
a plural low-refractive areas, each of which is disposed between the neighboring high-refractive areas, wherein the refractive index of the low-refractive areas is smaller than that of the first and second high-refractive areas;
a second substrate above the first substrate, wherein the second substrate comprises a plural transparent areas right above the light-focusing arrays; a second polarizer on the second substrate; and a liquid crystal layer located between the first substrate and the second substrate.

2. The high brightness liquid crystal display of claim 1, wherein the refractive index of the high-refractive areas is about 1.45 to about 1.80, and the refractive index of the low-refractive areas is about 1.25 to about 1.60.

3. The high brightness liquid crystal display of claim 1, wherein the high-refractive areas further comprise plural third high-refractive areas disposed symmetrically on outer sides of the second high-refractive areas, and the width of the third high-refractive areas is smaller than the width of the second high-refractive areas.

4. The high brightness liquid crystal display of claim 1, wherein the thickness of the high-refractive areas is greater than half of the width of the transparent areas.

5. The high brightness liquid crystal display of claim 1, wherein the thickness of the high-refractive areas is about 5 μm to about 300 μm.

6. The high brightness liquid crystal display of claim 1, wherein the second substrate further comprises light-defocusing arrays comprising plural low-refractive areas having refractive index smaller than that of the second substrate.

* * * * *